United States Patent

Montgomery et al.

[11] Patent Number: 6,066,262
[45] Date of Patent: May 23, 2000

[54] CONCRETE MIX WATER

[75] Inventors: Daniel P. Montgomery, Mesquite; Freda M. Bauer, Crandall, both of Tex.

[73] Assignee: Fritz Industries, Inc., Mesquite, Tex.

[21] Appl. No.: 09/209,719

[22] Filed: Dec. 11, 1998

Related U.S. Application Data

[62] Division of application No. 08/959,700, Oct. 29, 1997, Pat. No. 5,885,478.

[51] Int. Cl.$^7$ .................................................. C02F 1/66
[52] U.S. Cl. ........................ 210/752; 106/819; 210/749
[58] Field of Search ................................. 210/702, 712, 210/716, 717, 724, 723, 726, 728, 749, 752; 252/175, 179, 193; 106/819; 502/521

[56] References Cited

U.S. PATENT DOCUMENTS

| | | | |
|---|---|---|---|
| 2,351,160 | 6/1944 | Stone et al. ........................ | 252/179 X |
| 3,522,187 | 7/1970 | Kraus .................................. | 252/193 X |
| 3,850,835 | 11/1974 | Marantz et al. .................... | 252/179 X |
| 4,070,300 | 1/1978 | Moroni et al. ..................... | 252/193 X |
| 4,765,908 | 8/1988 | Monick et al. ..................... | 252/175 X |
| 5,234,603 | 8/1993 | Potts .................................. | 210/719 |
| 5,338,459 | 8/1994 | Hirose ................................ | 210/710 |
| 5,443,636 | 8/1995 | Montgomery ..................... | 106/805 |
| 5,833,863 | 11/1998 | Richards et al. .................. | 210/712 |
| 5,885,478 | 3/1999 | Montgomery et al. ............ | 252/175 |

OTHER PUBLICATIONS

"Treating Process Water" *The Concrete Porducer*, Yelton, Jun. 1997, 3 pages.
Safety Data Sheet, Mel Chemicals, Apr. 1995, 4 pages.

*Primary Examiner*—Peter A. Hruskoci
*Attorney, Agent, or Firm*—Thomas R. Weaver

[57] ABSTRACT

Water having alkalies selected from sodium, potassium and mixtures thereof dissolved therein is treated with a composition to reduce the concentration of the alkalies whereby the water is rendered usable according to ASTM standards to render the water usable as concrete mix water. The composition and the method of its use is disclosed herein, wherein the composition is selected from compounds in the group consisting of lithium carbonate, acid zirconium phosphate, carbon dioxide and mixtures thereof.

18 Claims, 7 Drawing Sheets

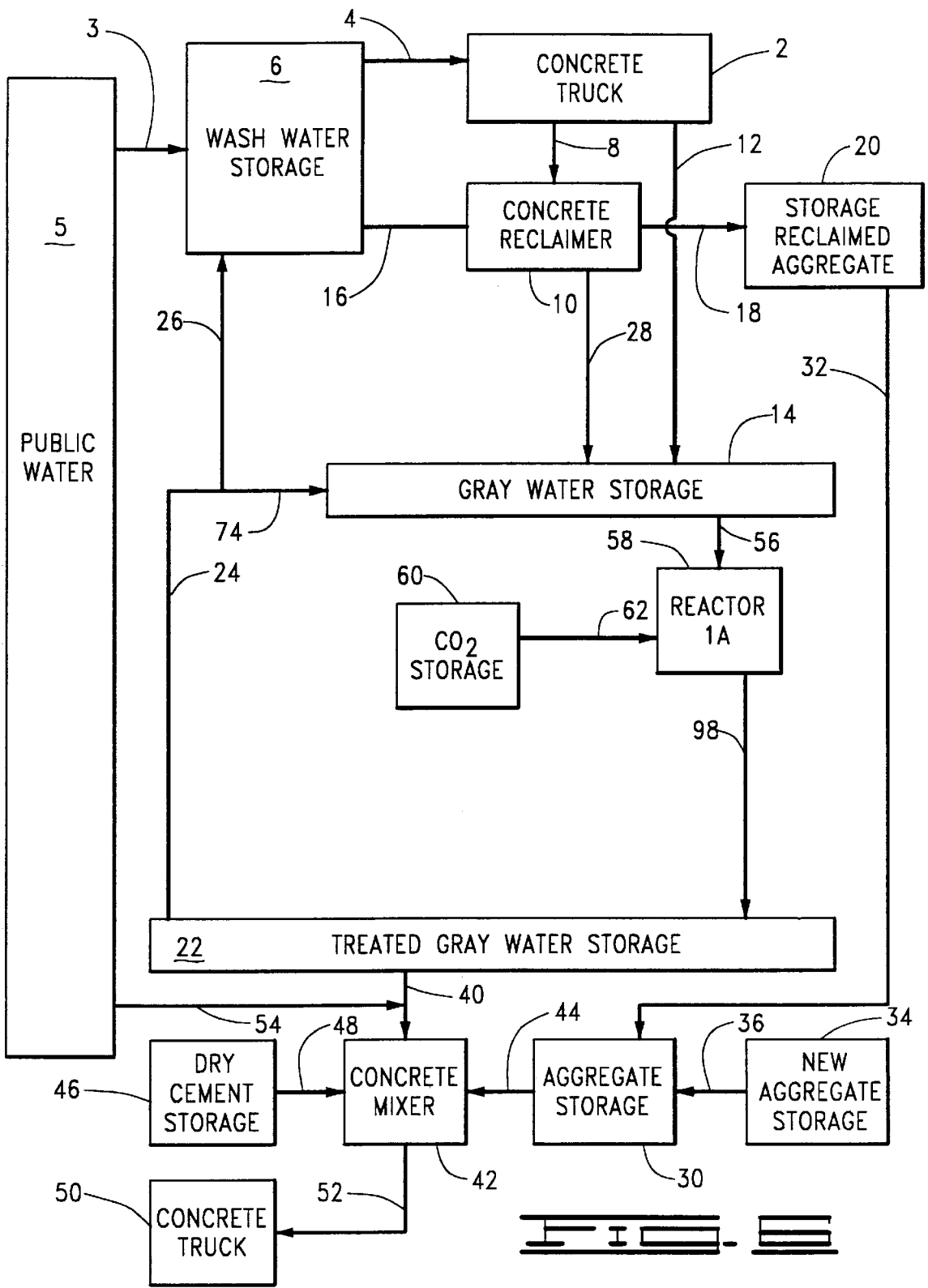

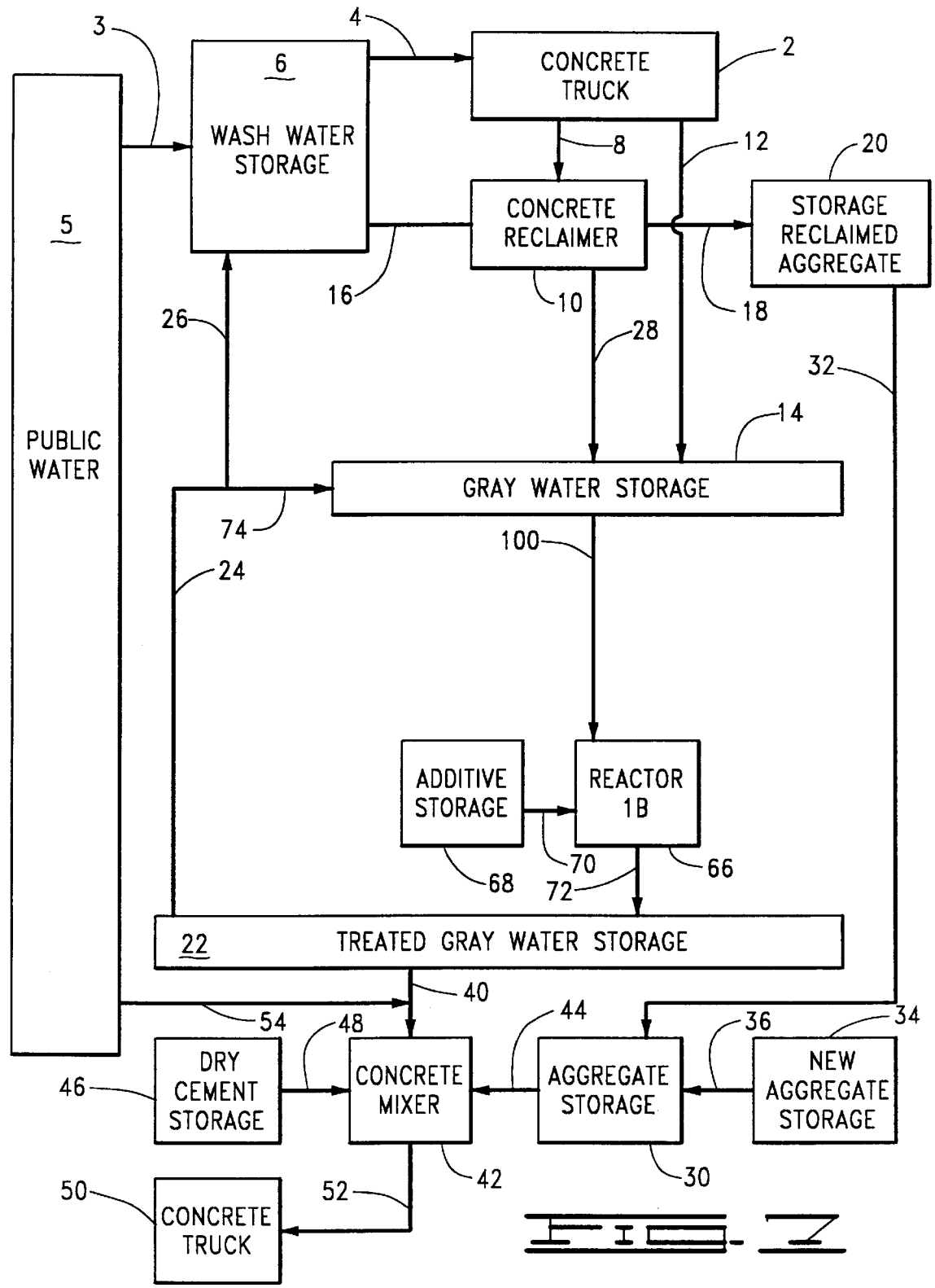

CONCRETE MIX WATER

This is a division of application Ser. No. 08/959,700, filed Oct. 29, 1997, now U.S. Pat. No. 5,885,478.

BACKGROUND OF THE INVENTION

1. Technical Field of the Invention

This invention broadly relates to water used to prepare fluid concrete, which is referred to in the concrete construction art as plastic concrete. The invention further relates to the physical separation of the liquid and solid components of plastic concrete, and, subsequent to the said physical separation, the invention still further relates to the chemical treatment of the liquid component of the plastic concrete to render the liquid component useful as mix water to make new plastic concrete.

2. Description of the Prior Art and Problems Solved

It is well known that concrete is useful as a basic and highly versatile material of construction. The versatility of concrete stems, at least in part, from the fact that concrete initially occurs in a fluid condition, which, after a period of time, converts to a monolithic solid condition. In the fluid condition, concrete, being comprised of discrete solids dispersed in water, has little or no compressive strength: it can be pumped; and it will flow into and assume the shape of a container, referred to in the art as a form. After a period of time, fluid concrete converts to the dense, rigid, monolithic solid condition having the shape of the form and exhibiting substantial compressive strength. For purposes of this disclosure, the fluid condition of concrete, is referred to herein as plastic concrete, and the monolithic solid condition of concrete is referred to herein as set concrete.

The solids dispersed in concrete are comprised of hydraulic cement and aggregate wherein the aggregate ordinarily, but not always, consists of graded coarse aggregate, i.e. rock, mixed with graded fine aggregate, i.e. sand.

It is known that plastic concrete can be prepared in one location, which can be remote from the place of its intended use, and then conveniently transported by known means, such as in a truck, to the place of its intended use. It is also known that plastic concrete can be prepared while being transported to the intended place of use. A truck ordinarily employed to transport plastic concrete is referred to in the art as a ready mix truck.

After plastic concrete has been delivered to the intended location of use in a ready mix truck and caused to flow therefrom into a form, it is known that some plastic concrete may be left in the truck or, at least, that the walls of the truck will be covered with a wet hydraulic cement residue. It is known that any plastic concrete or wet hydraulic cement residue remaining in the truck will conform to the shape of the truck as if it were a form, and, if permitted to remain undisturbed therein for a sufficient period of time, that the cementitious material will hydrate to thereby produce set concrete.

Operators of ready mix trucks do not desire plastic concrete or wet cement residue to set in their trucks. Accordingly, it is well known in the art that operators attempt to remove unused plastic concrete and/or wet hydraulic cement residue, both of which, separately and collectively, are, for convenience, referred to herein as "unset cement", from a ready mix truck by vigorously contacting the unset cement with water to dilute the unset cement whereby it is flushed from the truck. It is apparent that this water flush technique creates a disposal problem. At one time the disposal problem was not addressed, because the wash effluent, consisting of plastic concrete and a highly diluted mixture of aggregate and hydraulic cement, was merely dumped on the ground. This method can be an environmental problem, and, furthermore, constitutes a waste of water, aggregate and hydraulic cement. The handling and treatment of wash effluent and a solution to the disposal problem is the subject of this disclosure.

The prior art has attempted to harmonize the need to thoroughly wash unset cement from trucks while avoiding the practice of dumping the wash effluent on the ground. In this regard, the art has developed a method for physically separating the component parts of unset cement comprised of the steps of flushing unset cement from a container, such as a ready mix truck, by diluting the unset cement in the ready mix truck with a sufficient quantity of water to produce a wash effluent, comprised of aggregate, hydraulic cement and water, which will flow from the truck; placing the wash effluent in a storage/holding tank; and then performing a further series of steps, referred to in the art as concrete reclaiming, to separate the aggregate from the other named components of the wash effluent.

Concrete reclaiming is known in the art and is broadly comprised of the steps of contacting the mentioned wash effluent with a quantity of water sufficient to physically separate the hydraulic cement component from the aggregate component to form a solid phase which is distinctly separate from the liquid phase; separating the solid (aggregate) phase from the liquid phase in a clarification step or a sieve and size separation step to thereby produce one or more solid phase streams and a liquid stream; and, thereafter, storing the aggregate or aggregates for future use in new plastic concrete and storing the liquid stream, referred to in the art and herein as "gray water," in a holding pond or storage tank.

Gray water is not a true solution. It is comprised of finely divided solids which are dispersed in an aqueous liquid phase as well as solids which are dissolved in the aqueous liquid phase. In the prior art method described above, gray water is placed in a holding pond and is permitted to remain undisturbed therein for a time sufficient for the solid components thereof to settle and for the liquid component thereof to evaporate or to separate whereby the liquid can be removed by pumping. The solids are then excavated from the pond and disposed of in a landfill. A disposal problem, accordingly, still exists and water is still wasted.

The ability to use gray water to make new plastic concrete is a desirable object. If this use of gray water could be realized, then there would be no disposal problem and there would be no waste problem because the aggregate reclaimed cold be recycled, as it now is, to make new plastic concrete, and the gray water, which, as defined, includes the liquid component of the reclaimed plastic concrete and wash water, could also be recycled to make new plastic concrete. The prior art, however, as discussed below, has not solved the problem of treating gray water to render it completely useful as mix water to make plastic concrete.

It has been observed that set concrete made with mix water having an unacceptably high concentration of dissolved alkali metal exhibits low durability and tends to crumble. The prior art has not solved this problem in that it has failed to provide a method of treating potential mix water, for example array water, to convert alkalies dissolved in such water to a form which will not cause the production of set concrete which can be weak and/or unstable. In the context of this invention, the phrase "dissolved alkali metal"

and the word "alkalies" refer to sodium, potassium and mixtures thereof which is/are dissolved in the mix water. The sum of the concentrations of dissolved sodium and dissolved potassium is expressed as sodium oxide equivalents, [$Na_2O$]eq, in parts per million parts (ppm). To this end, the AMERICAN SOCIETY OF TESTING MATERIALS (ASTM) has published a Standard Specification For Ready-Mixed Concrete. ASTM C 94-89b, which establishes set time and performance criteria for plastic concrete which is made with water having questionable or otherwise unknown chemical content, and specifies the concentration limits of certain chemicals present in such water, Tables 1 and 2, below, contain the set time, performance and concentration limits referred to above.

TABLE 1

ACCEPTANCE CRITERIA FOR QUESTIONABLE WATER SUPPLIES

| PROPERTY | LIMIT | TEST METHOD |
|---|---|---|
| Minimum Compressive Strength, @ 7 days as a percent of control | 90% | ASTM C 109 |
| Set Time, deviation from control, Hrs:Mins | | ASTM C 191 |
| minimum earlier set | 1:00 | |
| maximum later set | 1:30 | |

TABLE 2

CHEMICAL LIMITATIONS FOR MIX WASH WATER

| DISSOLVED CHEMICAL maximum concentration in mix water | LIMIT ppm | TEST METHOD |
|---|---|---|
| Chloride, expressed as Cl | | ASTM D 512 |
| prestressed concrete | 500 | |
| concrete in bridge deck | 500 | |
| concrete in moist environments | 1000 | |
| concrete containing aluminum | 1000 | |
| concrete containing dissimilar metals | 1000 | |
| concrete contacting galvanized metal | 1000 | |
| SULFATE, expressed as $SO_4$ | 3000 | ASTM D 516 |
| ALKALIES, expressed as [$Na_2O$] + 0.68 [$K_2O$] | 600 | |
| TOTAL SOLIDS | 50,000 | AASHTO T26 |

With regard to the data in Table 2, notice that water having an ALKALIES concentration greater than 600 ppm cannot be employed as mix water to make plastic concrete which complies with ASTM specifications. It has been observed that gray water can, and often does, contain "dissolved alkali metal" in excess of 600 ppm and is, thus, not useable as mix water to make plastic concrete meeting ASTM specifications. However, such water, as demonstrated in Example 3, below, can be employed to make concrete, but the water does not comply with ASTM specifications.

This invention, accordingly, provides a method of treating water, for example gray water, containing alkali metal dissolved therein to convert the dissolved alkali metal content thereof to a nonreactive form or forms. The method thus operates to reduce the concentration of alkalies dissolved in the water whereby, for example, the water is rendered useable as mix water which meets ASTM specifications for making plastic concrete. The treated water is usable as mixing water without performing further steps to physically remove the alkali metals therefrom. Thus, in one preferred aspect of this invention, there is provided a method of using all components, solid and liquid, of old plastic concrete, and wash water to make new plastic concrete. This invention, accordingly, avoids the waste disposal and environmental problems associated with methods currently employed.

DISCLOSURE OF INVENTION

1. SUMMARY OF THE INVENTION

Water containing alkalies dissolved therein can be used to make plastic concrete which will hydrate to produce set concrete which is stable, which will not crumble and which is acceptable as a material of construction under ASTM specifications, if the concentration of alkalies dissolved in the water is equal to or less than a value of 600 ppm. This 600 ppm limit with regard to dissolved alkalies, relates to the reactivity of the alkalies in the solution with silica, "the alkali-silica reactivity", ASR, and the reactivity of the alkalies in the solution with aggregate, "the alkali-aggregate reactivity", AAR, each of which, to meet ASTM standards, must be reduced before the solution can be used to make plastic concrete. It is believed that the alkali-silica reactivity and the alkali-aggregate reactivity are thus sufficiently reduced to meet ASTM standards by lowering the concentration of alkalies dissolved in the water to a value equal to or less than 600 ppm.

Accordingly, by this invention there is provided a method of reducing the alkali-silica reactivity and the alkali-aggregate reactivity of an aqueous solution by reducing the concentration of dissolved alkalies in the solution wherein the method broadly comprises treating the aqueous solution with an additive selected from the group consisting of agents and mixtures thereof which function to deactivate sodium ion and potassium ion. Useful agents of the type described include lithium carbonate and acid zirconium phosphate. If the aqueous solution containing the alkalies dissolved therein also includes dissolved calcium, then the solution also can be contacted with carbon dioxide or a source of carbon dioxide preferably prior to treatment with the additive.

2. BRIEF DESCRIPTION OF THE DRAWING

FIG. 6 is a schematic flow diagram showing a method comprising the treatment of water solely with carbon dioxide, or a source thereof.

FIG. 7 is a schematic flow diagram showing a method comprising the treatment of water solely with the additive of this invention.

3. DESCRIPTION OF THE PREFERRED EMBODIMENTS

Figure 1:
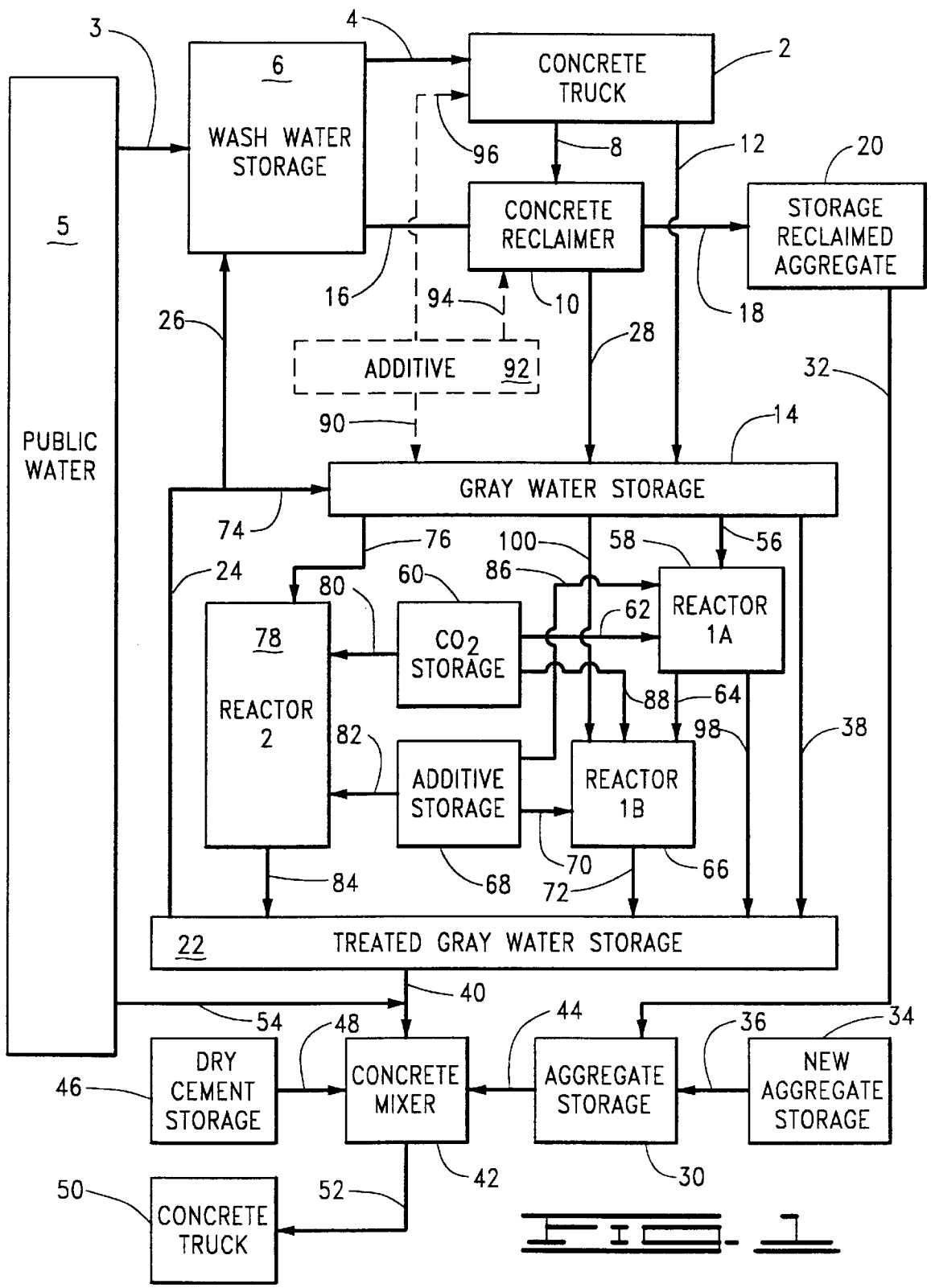
FIG. 1 is a schematic flow diagram of various treatment steps and paths and alternate treatment steps and paths which can be employed in the performance of the method of this invention. It will be noted that FIG. 1 is a substantial composite of the flow diagrams shown in FIGS. 2–7.
Figure 2:
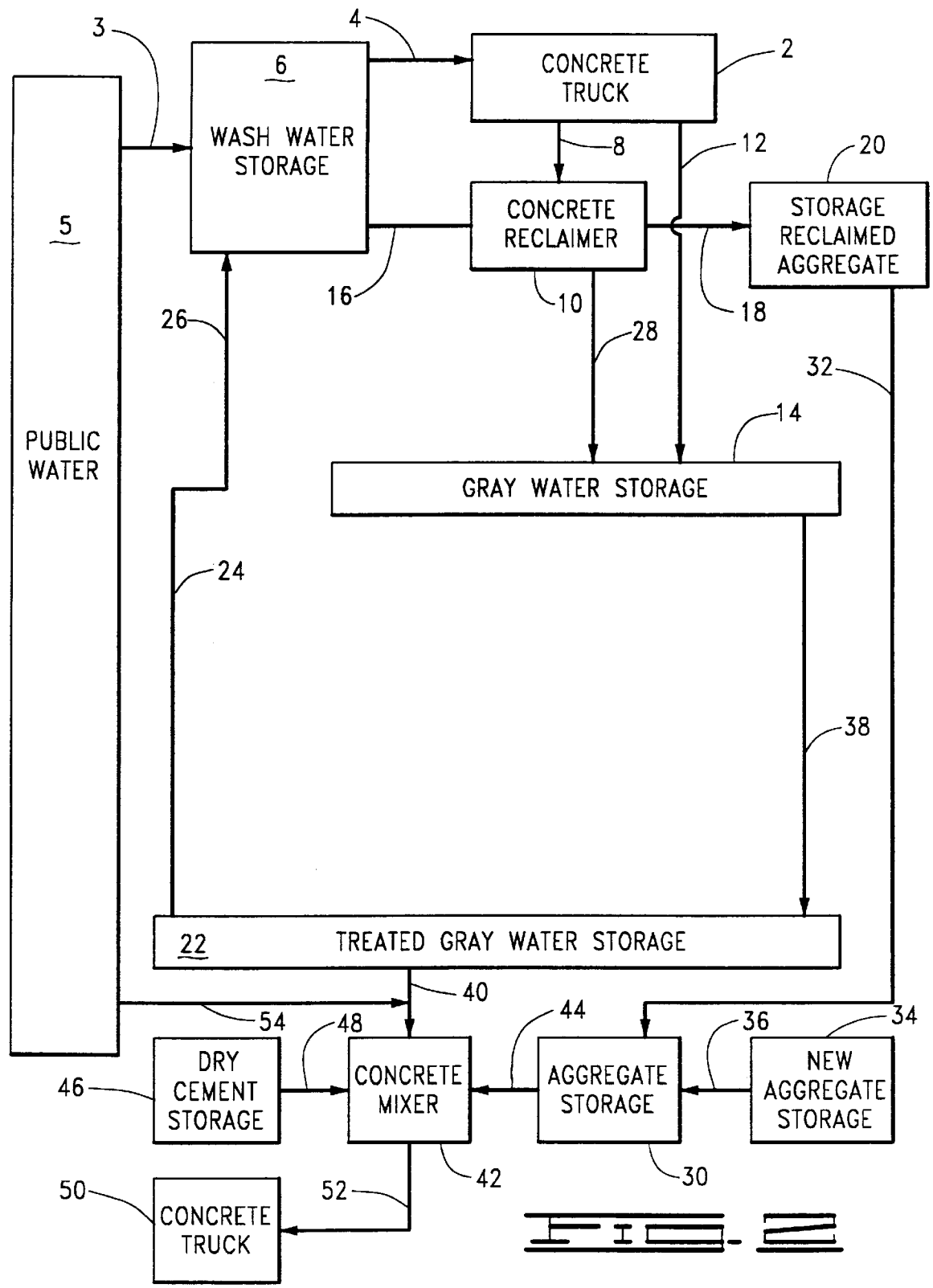
FIG. 2 is a schematic flow diagram showing a condition in which the chemical treatment of water by the method of this invention is not required.

Referring now to the Figures, and particularly to FIGS. 1 and 2, a quantity of unset cement comprised of plastic concrete and/or wet hydraulic cement, is held in container 2, such as a ready mix truck. A quantity of wash water is introduced into container 2 via line 4 from storage tank 6 in an amount sufficient to substantially completely flush all of the unset cement from container 2 via line 8 to concrete reclaimer zone 10. The wash water in storage tank 6 can be supplied from any source of water which, preferably, complies with the criteria specified in Tables 1 and 2, above. Such water can originate from public water supply 5, as well as from water recycled from treated gray water storage tank 22 which has been previously treated in accordance with this invention as described below. Water from water supply 5 is introduced into storage tank 6 via line 3. Water from treated gray water storage tank 22 is introduced into storage tank 6 via lines 24 and 26. Wash water in storage tank 6 can also be supplied from any source of water, not shown, which can, but preferably which does not, contain dissolved alkalies in excess of the limit specified in Table 2.

The content of line 8, referred to herein as wash effluent, is comprised of aggregate, hydraulic cement and water. However, as will become apparent hereinbelow, if the unset cement held in container 2 does not include a solid component phase or phases capable of being physically separated from the unset cement by conventional washing and clarification steps, then the unset cement can be flushed from container 2 via line 12 to gray water storage tank 14.

A quantity of wash water is introduced into concrete reclaimer zone 10 via line 16 from storage tank 6 in an amount sufficient to dilute the wash effluent in concrete reclaimer zone 10 by an amount sufficient to enable the physical separation of the liquid phase component of the wash effluent from the solid phase component of the wash effluent by conventional methods, such as by clarification, to thereby produce a liquid phase overflow stream and a solid phase or phases underflow stream. Conventional clarification apparatus and methods are described in the CHEMICAL ENGINEERS HANDBOOK, Third Edition, McGraw-Hill, 1950 at page 943 et seq.

The solid phase underflow stream, comprising wet aggregate, is transferred from concrete reclaimer zone 10 via line 18 to reclaimed aggregate storage zone 20 where it is held for future use, such as in the preparation of new plastic concrete. It is to be understood that storage zone 20 can include one or more separate facilities for storing aggregate of different sizes. The liquid phase overflow stream, comprising water having solids dissolved therein and finely divided solids dispersed therein, is transferred from concrete reclaimer zone 10 via line 28 to gray water storage tank 14 where it is held for future use, such as in the preparation of new plastic concrete, or for further treatment in accordance with this invention.

Reclaimed aggregate is transferred from storage zone 20 to aggregate storage zone 30 via line 32 for use in the preparation of new plastic concrete. New aggregate, that is aggregate which has not been treated in concrete reclaimer zone 10, can be transferred from new aggregate storage zone 34 to aggregate storage zone 30 via line 36 and mixed with reclaimed aggregate in aggregate storage zone 30 and the resulting mixture can be used in the preparation of new plastic concrete.

The liquid phase overflow stream, the array water, in gray water storage tank 14 is analyzed for dissolved alkali content, dissolved calcium content and pH. If the sum of the concentrations of dissolved sodium and dissolved potassium, expressed as sodium oxide equivalents, $[Na_2O]$ eq, is equal to or less than 600 parts per million parts (ppm), then further treatment of the gray water in accordance with this invention is not ordinarily required and the gray water can be transferred directly from gray water storage tank 14 to treated gray water storage tank 22 via line 38 for use in the preparation of new plastic concrete. If unset cement flushed from container 2 is the source of the gray water, then the above mentioned analysis of the gray water can be expected to reveal the presence of dissolved calcium. However, since calcium is a fundamental ingredient of cement, steps to treat the dissolved calcium are not required if dissolved alkalies are not present in a concentration greater than 600 ppm expressed as sodium oxide equivalents and if the solution pH is less than about 10.

The standard, cited in Table 2 above, set by the AMERICAN SOCIETY OF TESTING MATERIALS (ASTM) for the concentration of dissolved alkalies, i.e. sodium and potassium, in mix water as being equal to or less than 600 ppm, expressed as equivalents of sodium oxide, $[Na_2O]$eq, can be calculated as follows.

1. Let:

$$ppm[Na_2O]+(0.658)ppm[K_2O]=600,$$

wherein the ratio of the molecular weight of $Na_2O$ to the molecular weight of $K_2O$ is 0.658, the weight ratio, f1, of Na to $Na_2O$ is 0.7419 and the weight ratio, f2, of K to $K_2O$ is 0.8301.

2. Thus:
    a. If ppm $[K_2O]$=0, then ppm $[Na_2O]$=600, ppm [Na]= 445.1145 and ppm [O]=154.8855; and
    b. If ppm $[Na_2O]$=0, then ppm $[K_2O]$=911.8781, ppm [K]=756.9926 and ppm [O]=154.8855.

From the above calculations it is apparent that the cited ASTM standard for the concentration of dissolved alkalies can be attained by dissolved sodium alone, by dissolved potassium alone or by a mixture of dissolved sodium and dissolved potassium. It is further apparent that the maximum concentrations of sodium, alone, or potassium, alone, for the sodium oxide equivalent, $[Na_2O]$eq, to equal 600, are about 445 ppm and 757 ppm, respectively. As will be disclosed hereinbelow, it has been discovered that specific chemical compounds, referred to herein severally and collectively as the additive of this invention, can be added to gray water to convert sodium and potassium dissolved therein to species which will not react with silica to thereby reduce the alkali-silica reactivity and the alkali-aggregate reactivity of the mix water. Without being bound by any particular theory of operation, it is believed that such species are a type of complex; however, whatever the operation the concentration of alkalies dissolved in the solution is reduced.

New plastic concrete can be prepared by transferring treated gray water from treated gray water storage tank 22 via line 40 to concrete mixer 42 and there mixed in known manner with aggregate transferred thereto from aggregate storage zone 30 via line 44 and dry hydraulic cement transferred thereto from dry hydraulic cement storage zone 46 via line 48. Hydraulic cement useful herein, as well as the quantities of mix water, as treated gray water, and aggregate, transferred to and mixed in concrete mixer 42 are known in the art and are disclosed in U.S. Pat. No. 5,443,636 at column 9, lines 1–52. Upon mixing, the new plastic concrete can be transferred from mixer 42 to ready mix truck 50 via line 52 for transport to the desired location of use. It should be noted that the new plastic concrete can be mixed in truck 50 as well as in mixer 42. Accordingly, lines 40, 44 and 48 can be directed to truck 50 as well as to mixer 42.

Mix water can be supplied from another source, such as public water supply 5 via line 54 to line 40, to supplement and mix with treated gray water from storage 22 without experiencing adverse reactions associated with the combination of water from different sources. In this regard, any water mixed with treated gray water should not have an alkalies content in excess of the ASTM standard previously mentioned.

It is evident that the additive of this invention is not employed in the method described in connection with FIG. 2 and that the only deviation from prior art practice in connection with FIG. 2 is the analysis of gray water in storage tank 14 to determine its availability as mix water in mixer 42 without further treatment.

Accordingly, the broad invention herein is a method of reducing the alkali-silica reactivity, ASR, and the alkali-aggregate reactivity, AAR, of an aqueous solution by reducing the concentration of alkalies, as defined, dissolved in the aqueous solution. In one specific embodiment, the ASTM specifies that the concentration of alkalies in water to be employed as concrete mix water shall not be greater than 600 ppm. The method of this invention is useful to comply with this ASTM specification. Thus, the method of this invention comprises providing an aqueous solution having alkalies dissolved therein and mixing therewith a composition selected from the group consisting of car-bon dioxide, or a source thereof, an additive and mixtures thereof, wherein the additive is selected from the group consisting of lithium carbonate, acid zirconium phosphate and mixtures thereof.

The composition can, accordingly, include carbon dioxide, or a source of carbon dioxide, present in the composition in an amount in the range of from about 0 to about 100% by weight of composition: lithium carbonate present in the composition in an amount in the range of from about 0 to about 100% by weight of composition: and acid zirconium phosphate present in the composition in an amount in the range of from about 0 to 100% by weight of composition. It is preferred that the additive comprise lithium carbonate present in the additive in an amount in the range of from about 90 to about 95 percent by weight of additive and acid zirconium phosphate present in the additive in an amount in the range of from about 5 to about 10 percent by weight of the additive.

Figure 3:
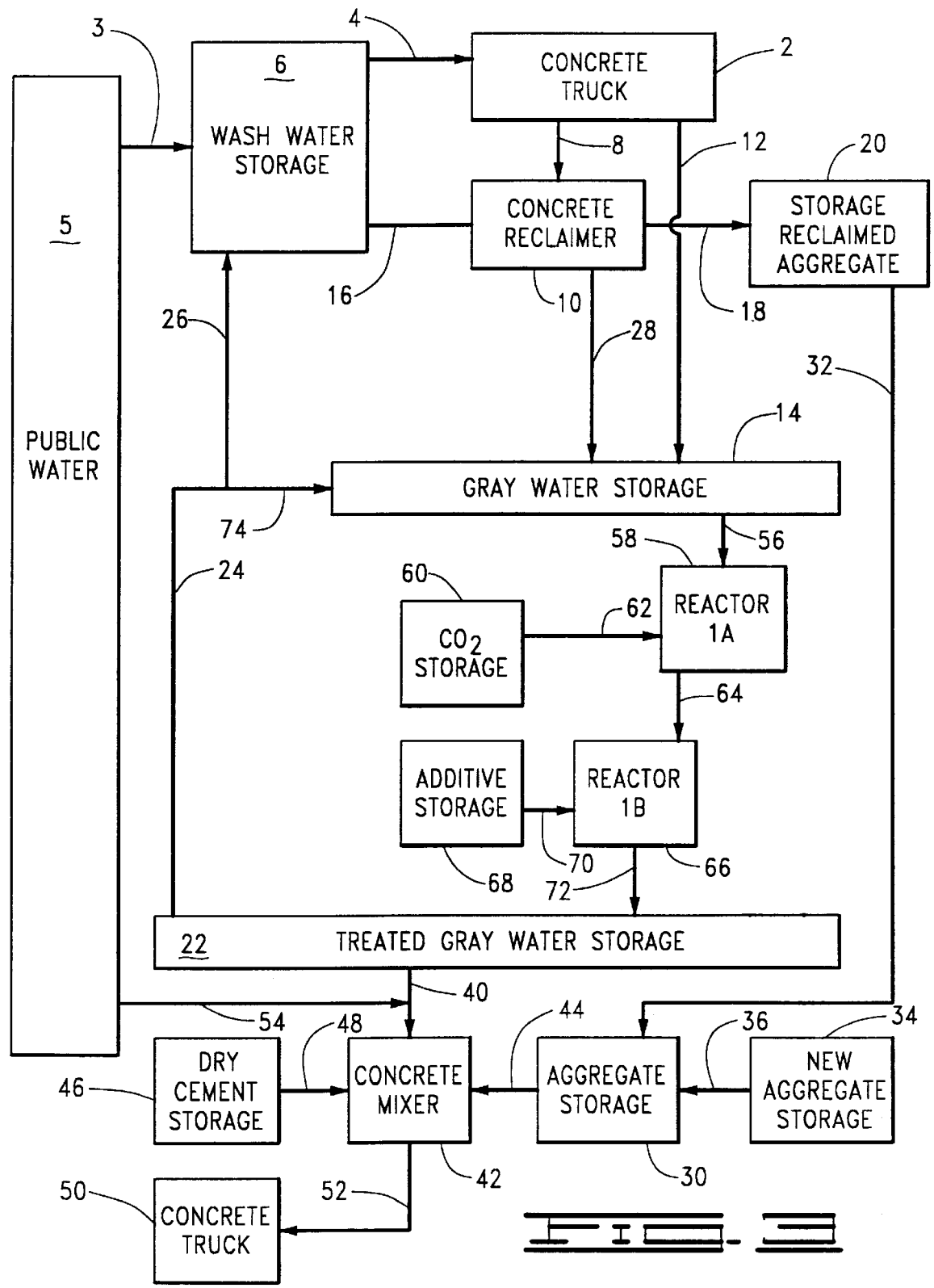
FIG. 3 is a schematic flow diagram showing a method comprising the sequential treatment of water with carbon dioxide, or a source thereof, followed by treatment with the additive of this invention.

Referring now to FIGS. 1 and 3, if, upon analysis of the gray water in gray water storage 14, it is determined that the concentration of dissolved sodium is greater than about 445 ppm, or the concentration of dissolved potassium is greater than about 757 ppm, or the sodium oxide equivalents are greater than 600 ppm and the concentration of dissolved calcium is greater than about 400 ppm and the solution pH is greater than about 10, then further treatment of the gray water in accordance with this invention is required in order to produce mix water which complies with ASTM specifications.

It has been discovered that lithium carbonate, $Li_2CO_3$, in the presence of sodium and potassium dissolved in water, acts to preferentially reduce the chemical reactivity of the dissolved sodium while exhibiting very little effect on the chemical reactivity of the dissolved potassium. Thus, when treating water having a sodium oxide equivalent concentration of greater than 600 ppm which includes a substantial concentration of dissolved potassium, it is preferred that lithium carbonate alone not be employed as the additive of this invention.

It has also been discovered that, while acid zirconium phosphate in the presence of sodium and potassium dissolved in water acts to preferentially reduce the chemical reactivity of the dissolved potassium, it will also reduce the chemical reactivity of the dissolved sodium by a limited amount. Thus, when treating water having a sodium oxide equivalent concentration of greater than 600 ppm which includes a substantial concentration of dissolved sodium, it is preferred that acid zirconium phosphate alone not be employed as the additive of this invention.

The term "acid zirconium phosphate" refers to the chemical species identified by chemical abstracts reference no. 13772-29-7 as phosphoric acid, zirconium (4+), salt(2:1), $PO_4H_3 \cdot \frac{1}{2}Zr$. While not intending to be bound by any presumed chemical formula, the above definition of acid zirconium phosphate appears to be met by the chemical composition, zirconium orthophosphate, $ZrO(H_2PO_4)_2 \cdot 3H_2O$, as shown in The Condensed Chemical Dictionary, 8th Edition, 1971, at page 956. MEL Chemicals of Manchester, England, is a source of acid zirconium phosphate useful herein.

Accordingly, when treating water having a sodium oxide equivalent concentration of greater than 600 ppm which includes a substantial concentration of dissolved sodium and a substantial concentration of dissolved potassium, it is preferred that the additive of this invention comprise a mixture of 95, preferably 90, weight percent lithium carbonate and 5, preferably 10, weight percent acid zirconium phosphate.

With regard to FIG. 3, it was stated above that the gray water to be treated included dissolved calcium present in an amount greater than about 400 ppm and that the solution pH was greater than about 10. In this connection it has also been discovered that the additive of this invention, comprising lithium carbonate and acid zirconium phosphate, introduced into water to reduce the chemical reactivity of sodium ion and potassium ion, as mentioned above, will preferentially react with dissolved calcium instead of sodium ion and potassium ion if the calcium ion concentration in the water is greater than about 400 ppm and the solution pH is greater than about 10. Accordingly, as shown in FIG. 3, gray water from storage 14 is introduced via line 56 into reactor zone 58, which is identified as reactor 1A on the Figures, and intermixed therein with carbon dioxide from $CO_2$ storage 60 introduced via line 62 into reactor zone 58. Carbon dioxide is dispersed and intermixed with gray water in reactor zone 58 in an amount sufficient to reduce the concentration of calcium ion in the water to a value of less than about 400, preferably less than about 200 ppm, and to reduce the solution pH to a value equal to or less than about 10. It is believed that the introduced carbon dioxide combines with the water to produce carbonic acid which in turn reduces solution pH and reacts with dissolved calcium to produce calcium carbonate, which is substantially insoluble in water, to thereby reduce the concentration of dissolved calcium.

It is believed to be important to avoid the use of a quantity of carbon dioxide which would in turn produce a quantity of carbonic acid sufficient to reduce solution pH to a value in the range of from about 7 to 8, because at this pH level precipitated calcium carbonate dissolves to form soluble calcium bicarbonate. Accordingly, overtreatment with carbonic acid is counter-productive to the object of reducing the concentration of dissolved calcium. The chemistry of carbon dioxide and gray water and related processing is discussed in "Treating Process Water," *The Concrete Producer*, June 1997 pages 441 to 443.

In view of the above it is preferred that the quantity of carbon dioxide employed be controlled to produce a solution pH in the range of from about 8 to about 10.

When carbon dioxide is used, it is believed that the disclosed desired results can be obtained by employing in the range of from about 2000 to about 3000 pounds of carbon dioxide per 10,000 gallons of gray water to be treated.

The array water, after having been pre-treated with carbon dioxide in reactor zone 58 to obtain the desired pH and dissolved calcium concentration, is introduced via line 64 into reactor zone 66, which is identified as reactor 1B on the Figures, and therein intermixed with the additive of this invention which is introduced into reactor zone 66 via line 70 from additive storage 68. The additive of this invention is dispersed and intermixed with the pre-treated gray water in reactor zone 66 in an amount sufficient to reduce the concentration of sodium oxide equivalents to a value which is equal to or less than 600 ppm.

It is believed that an amount of additive sufficient to reduce the concentration of sodium and potassium ions in the gray water to the indicated levels can be obtained by intermixing and dissolving the preferred additive of the invention with the pre-treated gray water in reactor zone 66 is an amount in the range of from about 200 to about 835 pounds additive per 10,000 gallons of gray water to be treated. It will be recalled that the preferred additive of this invention consists of 90 percent by weight lithium carbonate and 10 percent by weight acid zirconium phosphate. The quantities of additive mentioned above are expressed as 100 percent active ingredient.

It is noted that lithium carbonate and acid zirconium phosphate are only slightly soluble in water. Accordingly, to enhance the opportunity for the additive to contact sufficient water in which to dissolve, the additive can be introduced into the water as a suspension in a mineral oil. It is thus preferred that the additive be employed as a suspension in a non-aqueous liquid containing in the range of from about 3 to about 7 pounds of additive per gallon of oil. It has been found that a weight ratio of additive to oil of about 1 to 1 is sufficient to cause the additive to dissolve in the gray water. Furthermore, employing the technique of introducing the additive into the water in oil suspension, enables the use of known liquid metering procedures in the performance of the method.

Upon completion of the treatment in reaction zone 66 the treated gray water is transferred from reaction zone 66 to treated gray water storage 22 via line 72.

If, upon analysis, the water in treated gray water storage 22, is found to include dissolved calcium, sodium or potassium in an amount or amounts in excess of the above stated minimums, then the water can be returned to storage zone 14 via lines 24 and 74 for further treatment in accordance with the methods of this invention. However, if, upon analysis, the water in treated gray water storage 22, is found not to include dissolved calcium, sodium or potassium in an amount or amounts in excess of the above stated minimums, then the treated water is available for use as mix water and/or wash water as described in connection with FIG. 2.

Figure 4:
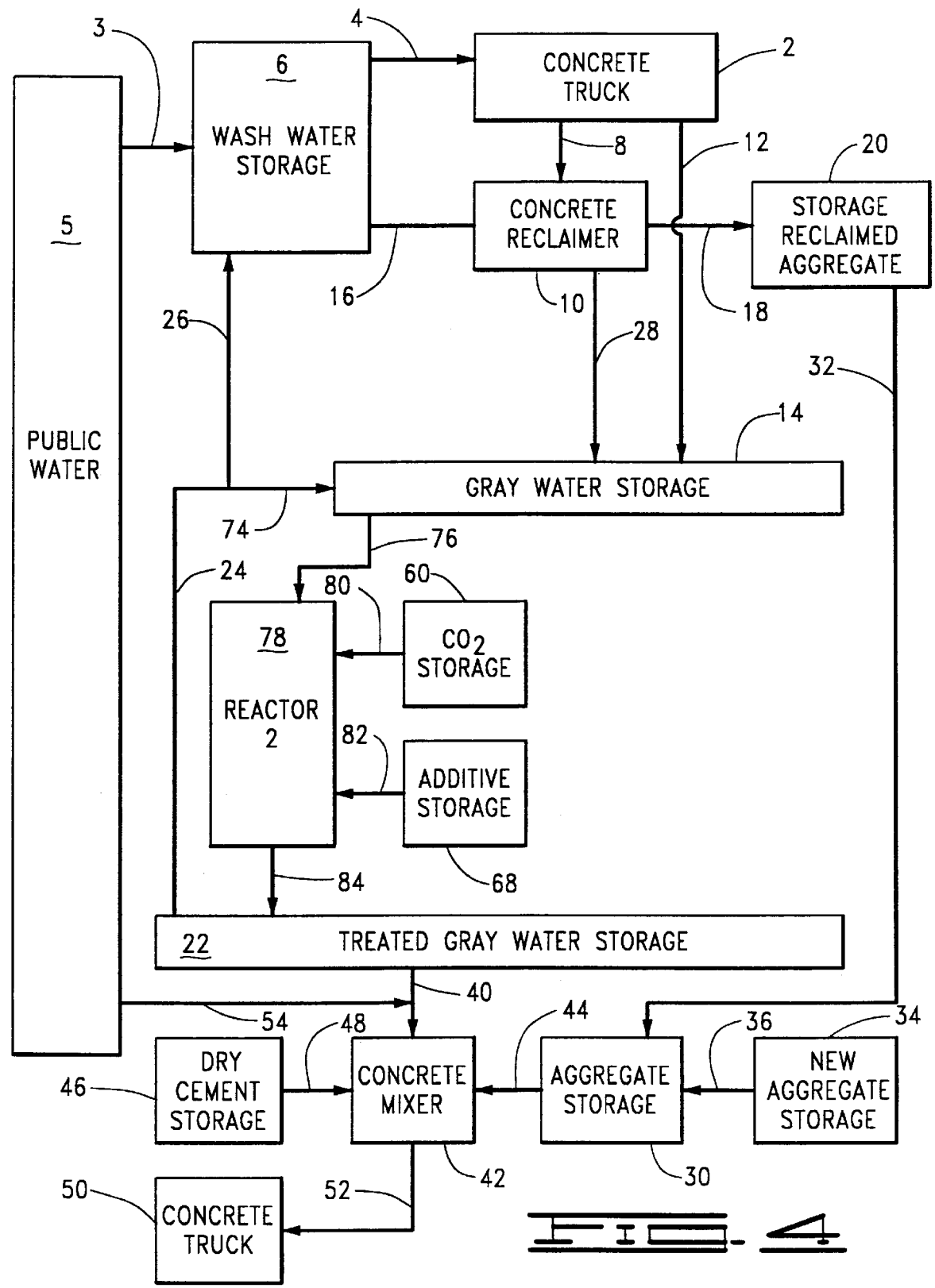
FIG. 4 is a schematic flow diagram showing a method comprising the simultaneous treatment of water with carbon dioxide, or a source thereof, and the additive of this invention.

The most preferred embodiment of this invention was disclosed above in connection with FIG. 3 wherein gray water was first treated with carbon dioxide and then with the additive of this invention. However, as shown in FIGS. 1 and 4, gray water can be treated simultaneously with carbon dioxide and the additive of this invention. Thus, gray water from storage 14 is introduced via line 76 into reactor zone 78, which is identified as reactor 2 on the Figures, and therein intermixed with carbon dioxide from $CO_2$ storage 60 introduced via line 80 into reactor zone 78. Carbon dioxide is dispersed and intermixed with gray water in reactor zone 78 in an amount sufficient to reduce the concentration of calcium ion in the water to a value of less than about 400, preferably less than about 200 ppm, and to reduce the solution pH to a value equal to or less than about 10. The additive of this invention is simultaneously introduced into reactor zone 78 via line 82 from additive storage 68. The additive of this invention is dispersed and intermixed with the gray water in reactor zone 66 in an amount sufficient to reduce the sodium oxide equivalent concentration to a value of less than or equal to 600 ppm.

Upon completion of the treatment in reaction zone 78 the treated gray water is transferred from reaction zone 78 to treated gray water storage 22 via line 84.

Treated gray water in treated gray water storage 22 is thereafter treated as described above in connection with FIGS. 2 and 3.

The additive of this invention was defined in connection with the descriptions of FIGS. 3 and 4 as being a combination of lithium carbonate and acid zirconium phosphate. This combination is based on the chemical content of the gray water treated in FIGS. 3 and 4. However, the additive introduced from additive storage 68 into each of reaction zones 66 and 78 also can be either lithium carbonate alone or acid zirconium phosphate alone depending upon the chemistry of the gray water to be treated.

Thus, referring to FIGS. 3 and 4, if, upon analysis of the gray water in gray water storage 14, it is determined that the concentration of dissolved sodium is not substantial and the sodium oxide equivalent concentration is greater than 600 ppm, the concentration of dissolved calcium is greater than about 400 ppm and the solution pH is greater than about 10, then treatment of the gray water can proceed as described in connection with FIGS. 3 and 4 except that the additive to be employed is limited to acid zirconium phosphate alone in an amount consistent with the concentration of acid zirconium phosphate in the combination as previously disclosed.

However, also referring to FIGS. 3 and 4, if, upon analysis of the array water in gray water storage 14, it is determined that the sodium oxide equivalent concentration is greater than 600 ppm, the concentration of dissolved potassium is not substantial, the concentration of dissolved calcium is greater than about 400 ppm and the solution pH is greater than about 10, then treatment of the gray water can proceed as described in connection with FIGS. 3 and 4 except that the additive to be employed is limited to lithium carbonate alone in an amount consistent with the concentration of lithium carbonate in the combination as previously disclosed.

Figure 5:
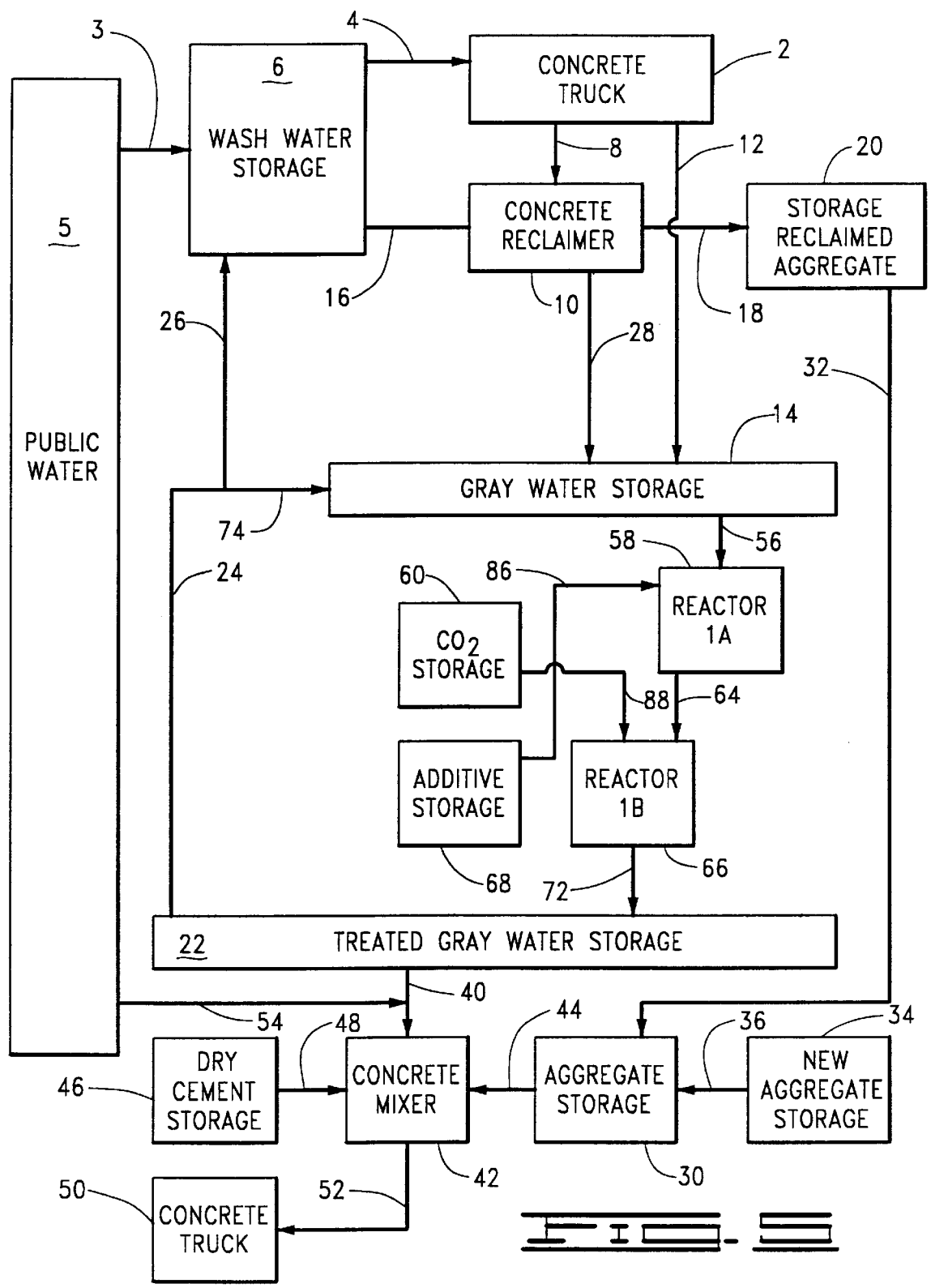
FIG. 5 is a schematic flow diagram showing a method comprising the sequential treatment of water with the additive of this invention followed by treatment with carbon dioxide, or a source thereof.

Referring now to FIGS. 1 and 5, note the order of addition of carbon dioxide and additive to the gray water is the reverse of the order of addition disclosed in connection with FIG. 3. Accordingly, in another aspect of the method of this invention, as shown in FIG. 5, the gray water is first treated with the additive in reactor zone 58 and thereafter treated with carbon dioxide in reactor zone 66.

Thus, with regard to FIG. 5, the gray water to be treated includes dissolved calcium present in an amount greater than about 400 ppm, the solution pH is greater than about 10 and the concentration of sodium oxide equivalents is greater than 600 ppm. Accordingly, gray water from storage 14 is introduced via line 56 into reactor zone 58, which is identified as reactor 1A on the Figures, and therein intermixed with the additive of this invention which is introduced into reactor zone 58 via line 86 from additive storage 68. The additive of this invention is dispersed and intermixed with the gray water in reactor zone 58 in an amount sufficient to reduce the sodium oxide equivalent concentration to a value less than or equal to 600 ppm.

The gray water, after having been pre-treated with the additive of this invention in reactor zone 58 is introduced via line 64 into reactor zone 66, which is identified as reactor 1B on the Figures, and therein intermixed with carbon dioxide introduced into reactor zone 66 from $CO_2$ storage 60 via line 88. Carbon dioxide is dispersed anti intermixed with gray water in reactor zone 66 in an amount sufficient to reduce the concentration of calcium ion in the water to a value of less than about 400, preferably less than about 200 ppm, and to reduce the solution pH to a value equal to or less than about 10. It is preferred that the quantity of carbon dioxide employed be controlled to produce a solution pH in the range of from about 8 to about 10.

Upon completion of the treatment in reaction zone 66 the treated gray water is transferred from reaction zone 66 to treated gray water storage 22 via line 72 and is thereafter treated as described above in connection with FIGS. 2 and 3.

Since the method of this invention as performed in connection with FIG. 5 features the gray water being first treated with the additive and, thereafter, being treated with carbon dioxide, the point of treatment with additive is not limited to reactor zone 58 which is located downstream from storage 14. Thus, referring to FIG. 1, additive can be introduced into gray water storage 14 via line 90 from alternative additive storage 92, or into reclaimer 10 via line 94 from alternative additive storage 92 or into concrete truck 2 via line 96 from alternative additive storage 92.

In still another aspect of the method of this invention, if the concentration of alkalies dissolved in the gray water is less than or equal to 600 ppm sodium oxide equivalents, i.e.

$$ppm[Na_2O]+(0.658)ppm[K_2O] \leq 600 \text{ ppm},$$

but the solution pH is greater than 10, then carbon dioxide is preferably added to the gray water to reduce the pH to a value of 10 or less and the concentration of dissolved calcium in the solution to a value of about 400 ppm and preferably to a value of less than about 200 ppm. Thus, as shown in FIGS. 1 and 6, and as described with respect to FIG. 3, gray water from storage 14 is introduced via line 56 into reactor zone 58, which is identified as reactor 1A on the Figures, and intermixed therein with carbon dioxide introduced into reactor zone 58 via line 62 from $CO_2$ storage 60. Carbon dioxide is dispersed and intermixed with gray water in reactor zone 58 in an amount sufficient to reduce the concentration of calcium ion in the water to a value of less than about 400, preferably less than about 200 ppm, and to reduce the solution pH to a value equal to or less than about 10.

For reasons previously stated, it is preferred that the quantity of carbon dioxide employed be controlled to produce a solution pH in the range of from about 8 to about 10.

When carbon dioxide is used, it is believed that the disclosed desired results can be obtained by employing in the range of from about 2000 to about 3000 pounds of carbon dioxide per 10,000 gallons of gray water to be treated.

The gray water, after having been treated with carbon dioxide in reactor zone 58 to obtain the desired pH and dissolved calcium concentration, is transferred from reaction zone 58 to treated array water storage 22 via line 98 and is thereafter treated as described above in connection with FIGS. 2 and 3.

In still another aspect of the method of this invention, if the concentration of alkalies dissolved in the gray water is greater than 600 ppm sodium oxide equivalents, i.e.

$$ppm[Na_2O]+(0.658)ppm[K_2O]>600 \text{ ppm},$$

but the solution pH is less than or equal to 10, and the concentration of dissolved calcium in the solution is less than 400 ppm, then carbon dioxide is not added to the gray water. Thus, as shown in FIGS. 1 and 7, gray water from storage 14 is introduced via line 100 into reactor zone 66, which is identified as reactor 1B on the Figures, and intermixed therein with the additive of this invention which is introduced into reactor zone 66 via line 70 from additive storage 68. The additive of this invention is dispersed and intermixed with the gray water in reactor zone 66 in an amount sufficient to reduce the concentration of sodium oxide equivalents in the water to a value of less than or equal to 600 ppm.

The gray water, after having been treated with the additive of this invention in reactor zone 66 to reduce the level of alkalies dissolved in the water to a value less than or equal to 600 ppm sodium oxide equivalents, is transferred from reaction zone 66 to treated gray water storage 22 via line 72 and is thereafter treated as described above in connection with FIGS. 2 and 3.

As previously stated, the point of treatment of gray water with additive is not limited to reactor zone 66 which is located downstream from storage 14. Thus, referring to FIG. 1, additive can be introduced into gray water storage 14 via line 90 from alternative additive storage 92, or into reclaimer 10 via line 94 from alternative additive storage 92 or into concrete truck 2 via line 96 from alternative additive storage 92.

The additive of this invention has been defined as being a combination of lithium carbonate and acid zirconium phosphate. This combination, however, is based on the chemical content of the gray water to be treated. Thus, the additive introduced from additive storage 68 and 92 into any of the various disclosed reaction zones also can be either lithium carbonate alone or acid zirconium phosphate alone depending upon the chemical content of the gray water to be treated.

Thus, if it is determined that the concentration of dissolved sodium is not substantial and the concentration of sodium oxide equivalents is greater than 600 ppm, then the additive to be employed in the treatment of the gray water is limited to acid zirconium phosphate alone in an amount consistent with the concentration of acid zirconium phosphate in the combination as previously disclosed.

However, if it is determined that the concentration of dissolved sodium oxide equivalents is greater than 600 ppm and the concentration of dissolved potassium is not substantial, then the additive to be employed in the treatment of the gray water is limited to lithium carbonate alone in an amount consistent with the concentration of lithium carbonate in the combination as previously disclosed.

The carbon dioxide employed herein can be from any source which upon contact with water can form carbonic acid. Such sources include carbon dioxide in the gas, liquid or solid phases.

EXAMPLES

The following examples illustrate the operation of this invention, but the scope of the invention is not limited to the specific contents of the examples.

Example 1

Six samples of gray water were acquired from various sources. Each sample was analyzed to obtain the sodium oxide equivalent thereof, $Na_2O$ eq, according to the formula:

$$X \text{ ppm } Na_2O+(0.658)Y \text{ ppm } K_2O=Z \text{ ppm } Na_2O \text{ eq}$$

Gray water samples 2, 3, 4, and 5 were each divided into two parts, wherein one part was treated and analyzed, as described below, and the second part was not treated. The untreated portion and the treated portion were both continuously stirred with an air driven propeller mixer during the entire period of treatment and for an additional 24 hour period subsequent to the end of the treatment. Thereafter, the treated portion and the untreated portion were each analyzed for sodium oxide equivalent concentration.

Each treated sample was then combined with 2.5 grams of the additive of this invention per liter of gray water. The resulting combination of gray water and additive was then mixed for 15 minutes. Thereafter, each sample containing the additive was injected with carbon dioxide at the rate of 0.5 pounds of carbon dioxide per gallon of gray water over a period of 8 hours. After the period of carbon dioxide injection each sample was again analyzed to obtain the sodium oxide equivalent.

It is noted that the treatment method employed corresponded with the method described in connection with FIG. 5, above, wherein the content of line 56 is representative of the gray water to be treated and the content of line 72 is representative of the gray water treated in accordance with an aspect of this invention.

The additive, which consisted of 90 parts by weight lithium carbonate and 10 parts by weight acid zirconium phosphate, was combined with the gray water in a mineral oil suspension consisting of 1 pound of additive per 1 pound of viscosified mineral oil.

The results are provided in Table 3, below.

TABLE 3

GRAY WATER TREATMENT

| Gray Water Sample | ppm sodium oxide equivalents | | | |
|---|---|---|---|---|
| | initial | | 24 hour | |
| | untreated | treated | untreated | treated |
| 1a | 811 | | | |
| 1b | | 374 | | |
| 2a | 688 | | | |
| 2b | | 389 | | |
| 2c | | | 717 | |
| 2d | | | | 427 |
| 3a | 971 | | | |
| 3b | | 151 | | |
| 3c | | | 986 | |
| 3d | | | | 231 |
| 4a | 1325 | | | |
| 4b | | 694 | | |
| 4c | | | 1239 | |
| 4d | | | | 437 |
| 5a | 1848 | | | |
| 5b | | 701 | | |
| 5c | | | 2243 | |
| 5d | | | | 931 |
| 6a | 944 | | | |
| 6b | | 415 | | |

Example 2

Untreated gray water samples 4a and 5a and treated gray water samples 4b and 5b from Table 3, above, were employed to make mortar cubes. The cubes, which were 2-inch by 2-inch by 2-inch in dimension, were tested to determine compressive strength in accordance with ASTM test method C109. Cubes made from available potable water were also tested to determine compressive strength to provide a control comparison for the samples from Table 3.

Several different batches of plastic mortar were prepared for use in the forming of the above mentioned cubes wherein the difference in batches resided in the type of mix water employed. Accordingly, one batch was made with control water, i.e., available potable water, one with gray water (samples 4a and 5a) and one with treated gray water (samples 4b and 5b) wherein each batch employed dry ASTM Class I hydraulic cement and aggregate as specified in ASTM standard C109. Each such batch employed 1000 grams of dry cement and 2.75 grams of sand per gram of dry cement. The quantity of mix water employed was varied to obtain approximately the same flow. (Note ASTM C109 paragraph 10.3)

Accordingly, with specific respect to samples 5a and 5b, the control batch employed 0.485 grams of potable water per gram of dry cement for a flow of 77. The gray water batch employed 0.804 grams of gray water per gram of dry cement for a flow of 75.5 and the treated gray water batch employed 0.842 grams of gray water per gram of dry cement for a flow of 75.5.

Plastic mortar was placed into each cube mold and allowed to set at 77 to 78 degrees Fahrenheit.

The time to initial set was determined and recorded. Each cube was subjected to compressive loading to determine the compressive strength of each at given intervals after the making of each batch of plastic mortar. The determined strengths were then compared.

The results for samples 4a and 4b are contained in Table 4 and the results for samples 5a and 5b are contained in Table 5.

TABLE 4

INITIAL SET AND COMPRESSIVE STRENGTH EVALUATION MIX WATER

| | control | untreated gray water sample 4a | treated gray water sample 4b |
|---|---|---|---|
| Initial Set, hrs:mins | 03:30 | 01:30 | 01:45 |
| Compressive Strength, psi | | | |
| 1 day | 2020 | 1940 | 2340 |
| 5 day | 3470 | 3300 | 4190 |
| 15 day | 4240 | 3980 | 5000 |
| 28 day | 4260 | 4410 | 4940 |
| % of Control | | | |
| 1 day | | 96 | 116 |
| 5 day | | 95 | 121 |
| 15 day | | 94 | 118 |
| 28 day | | 104 | 116 |

TABLE 5

INITIAL SET AND COMPRESSIVE STRENGTH EVALUATION MIX WATER

| | control | untreated gray water sample 5a | treated gray water sample 5b |
|---|---|---|---|
| Initial Set, hrs:mins | 02:53 | 01:25 | 01:25 |
| Compressive Strength, psi | | | |
| 1 day | 1930 | 2080 | 2700 |

TABLE 5-continued

INITIAL SET AND COMPRESSIVE STRENGTH EVALUATION MIX WATER

|  | control | untreated gray water sample 5a | treated gray water sample 5b |
|---|---|---|---|
| 6 day | 4120 | 4220 | 4890 |
| 18 day | 5180 | 4980 | 5970 |
| 28 day | 5220 | 5470 | 6200 |
| % of Control |  |  |  |
| 1 day |  | 108 | 140 |
| 6 day |  | 102 | 119 |
| 18 day |  | 96 | 115 |
| 28 day |  | 105 | 119 |

Example 2

Gray water from a concrete reclaimer, such as shown in item 10 of FIG. 5, was analyzed for sodium oxide equivalents, as described in Example 1, and introduced into a storage zone, such as shown in item 14 of FIG. 5, which was being constantly stirred, as described in Example 1. Gray water from the storage zone was then treated as described in Example 1, above.

Water contained in the lines designated by reference numbers 28, 56, 64 and 72 of FIG. 5 was analyzed for sodium oxide equivalent concentration. The following results were obtained:

| Line 28, 565 ppm | Line 56, 828 ppm |
|---|---|
| Line 64, 437 ppm | Line 72, 217 ppm |

Water having additive dissolved therein (line 64) was treated with carbon dioxide in Reactor 1B, item 66 of FIG. 5, and during such treatment was analyzed for sodium oxide equivalent concentration on an hourly basis. The following results were obtained:

| Hour 1, 521 ppm | Hour 2, 408 ppm |
|---|---|
| Hour 3, 373 ppm | Hour 4, 224 ppm |
| Hour 5, 226 ppm | Hour 6, 226 ppm |
| Hour 7, 218 ppm | Hour 8, 217 ppm. |

Example 3

Four batches of compressive test cylinders having a diameter of 6 inches and a height of 12 inches were prepared from water employed in Example 2, above. Accordingly, the first batch was prepared from untreated gray water (828 ppm sodium oxide equivalent). The second batch was prepared from treated gray water (217 ppm sodium oxide equivalent). The third batch was prepared from untreated gray water (828 ppm sodium oxide equivalent) containing a set time retarder. The fourth batch was prepared from treated gray water (217 ppm sodium oxide equivalent) containing a set time retarder. A fifth batch was prepared from available potable water for purposes of control.

The recipe employed to prepare the concrete was selected to produce a cured concrete product having a compressive strength of at least 3000 psi wherein each batch contained 470 pounds of ASTM type I cement, approximately 3.7 pounds of course aggregate per pound of dry cement, approximately 3.0 pounds of fine aggregate per pound of dry cement and further wherein the mix water employed in each batch was varied to provide approximately the same slump for each batch. Furthermore, for purposes of comparison, calcium lignosulfonate set time retarder was employed in one batch of concrete made with untreated gray water and in one batch of concrete containing treated gray water. Accordingly, the water content and retarder content of each batch is set out in Table 6, below.

TABLE 6

| BATCH | MIX WATER type | RETARDER fluid ounces |
|---|---|---|
| 1 | untreated gray water | 0 |
| 2 | treated gray water | 0 |
| 3 | untreated gray water | 18.8 |
| 4 | treated gray water | 18.8 |
| 5 | potable | 0 |

The test results, which include initial set time, slump and compressive strength at 1, 7 and 14 days after mixing are set out in Table 7, below.

TABLE 7

INITIAL SET, SLUMP and COMPRESSIVE STRENGTH

| | BATCH | | | | |
|---|---|---|---|---|---|
| | 1 | 2 | 3 | 4 | 5 |
| Initial Set, hrs:mins | 03:55 | 04:30 | 05:30 | 05:10 | 05:15 |
| Slump, inches | 5.00 | 5.25 | 4.50 | 4.50 | 4.75 |
| Compressive strength, psi | | | | | |
| 1 day | 420 | 570 | 671 | 740 | 670 |
| 7 day | 2410 | 2980 | 3025 | 3340 | 2890 |
| 14 day | 3120 | 3520 | 3430 | 3925 | 3430 |
| % of Control | | | | | |
| 1 day | 63 | 85 | 100 | 110 | 100 |
| 7 day | 83 | 103 | 105 | 116 | 100 |
| 14 day | 91 | 103 | 100 | 114 | 100 |

With respect to the above Examples observe Table 3 and Example 2 and note that the sodium oxide equivalent concentration of the gray water treated by the method of this invention was substantially reduced. Note further that samples 4b, 5 b and 5d of Table 3 would require further treatment in accordance with this invention to produce a concrete mix water which would comply with the ASTM sodium oxide equivalent concentration as stated in Table 2, above.

Now observe Tables 4, 5 and 7 and note that the treated gray water samples 4b and 5b from Table 3 and the treated gray water samples (Table 7, batches 2 and 4) from Example 2, when used as mix water to make concrete, produced values for compressive strength which were well in excess of the ASTM minimum value as stated in Table 1, above. However, samples 4b and 5b experienced deviations from set time in excess of the time specified by the ASTM as set forth in Table 1, above. In this connection, as seen in Table 7, batch 4 shows that gray water can be treated in accordance with this invention to produce concrete mix water which meet Alkalies levels, compressive strength and set time requirements established by the ASTM.

Having thus described the invention, that which is claimed is:

1. A method of reducing the concentration of alkalies dissolved in an aqueous solution said method being comprised of the steps of:
   providing an aqueous solution having alkalies dissolved therein wherein said alkalies are selected from the group consisting of sodium, potassium and mixtures thereof;
   placing an effective amount of an additive in contact with said solution wherein said additive is a composition selected from the group consisting of lithium carbonate, acid zirconium phosphate and mixtures thereof; and
   maintaining said contact for a time sufficient to reduce said concentration of said alkalies dissolved in said aqueous solution.

2. The method of claim 1 wherein said effective amount of said additive is an amount sufficient to reduce said concentration from a first concentration to a second concentration.

3. The method of claim 2 wherein said first concentration and said second concentration, each expressed as parts per million (ppm) of sodium oxide equivalents, $[Na_2O]eq$, are each determined by the equation, $$[Na_2O]+(0.658)[K_2O]=[Na_2O]eq$$

wherein $[Na_2O]$ is the concentration of sodium in said solution, expressed as ppm sodium oxide, and $[K_2O]$ is the concentration of potassium in said solution, expressed as ppm potassium oxide.

4. The method of claim 3 wherein said first concentration is greater than 600 and said second concentration is equal to or less than 600.

5. The method of claim 4 wherein said additive is a mixture consisting essentially of 90 to 95 parts by weight lithium carbonate and 5 to 10 parts by weight acid zirconium phosphate.

6. The method of claim 4 wherein said aqueous solution further includes calcium dissolved therein, wherein the concentration of calcium dissolved in said solution is greater than 400 ppm and the pH of said solution is greater than 10.

7. The method of claim 6 wherein carbon dioxide is placed in contact with said aqueous solution in an amount effective to reduce the concentration of said calcium dissolved in said aqueous solution and to reduce the pH thereof.

8. The method of claim 7 wherein said effective amount of said carbon dioxide is an amount sufficient to reduce said concentration of said calcium to a value less than 400 ppm and said pH to a value in the range of from about 8 to about 10.

9. The method of claim 8 wherein said additive is lithium carbonate.

10. The method of claim 8 wherein said additive is acid zirconium phosphate.

11. The method of claim 8 wherein said additive is a mixture consisting essentially of 90 to 95 parts by weight lithium carbonate and 5 to 10 parts by weight acid zirconium phosphate.

12. The method of claim 4 wherein said aqueous solution, having been contacted with said additive to reduce said concentration of said alkalies dissolved in an aqueous solution to a value equal to said second concentration, is employed as mix water to make plastic concrete.

13. The method of claim 1 wherein said contact is performed by dispersing said additive in said solution.

14. The method of claim 1 wherein said aqueous solution is also contacted with carbon dioxide.

15. A method of reducing the concentration of alkalies dissolved in an aqueous solution said method being comprised of the steps of:
   contacting said aqueous solution with an effective amount of an additive for a time sufficient to reduce said concentration of said alkalies dissolved in said aqueous solution from a first concentration to a second concentration;
   wherein said alkalies are selected from the group consisting of sodium, potassium and mixtures thereof and wherein said additive is a composition selected from the group consisting of lithium carbonate, acid zirconium phosphate and mixtures thereof.

16. The method of claim 15 wherein the pH of said aqueous solution is greater than 10, said aqueous solution contains more than 400 ppm calcium dissolved therein and is contacted with an effective amount of carbon dioxide to reduce said pH to a value in the range of from 8 to 10 and the calcium dissolved therein to less than 200 ppm.

17. The method of claim 16 wherein said first concentration and said second concentration, each expressed as parts per million (ppm) of sodium oxide equivalents, $[Na_2O]eq$, are each determined by the equation, $$[Na_2O]+(0.658)[K_2O]=[Na_2O]eq$$

wherein $[Na_2O]$ is the concentration of sodium in said solution, expressed as ppm sodium oxide, and $[K_2O]$ is the concentration of potassium in said solution, expressed as ppm potassium oxide and further wherein said first concentration is greater than 600 and said second concentration is equal to or less than 600.

18. The method of claim 17 wherein said alkalies are a mixture of sodium and potassium and said additive is a mixture consisting essentially of 90 to 95 parts by weight lithium carbonate and 5 to 10 parts by weight acid zirconium phosphate.

* * * * *